(12) United States Patent
Hardinghaus et al.

(10) Patent No.: US 8,119,716 B2
(45) Date of Patent: *Feb. 21, 2012

(54) METHOD OF GENERATING A DISPERSION OF DEAGGLOMERATED BARIUM SULPHATE IN PLASTICS OR PLASTICS PRECURSORS

(75) Inventors: Ferdinand Hardinghaus, Bad Honnef (DE); David-Christopher Glende, Bovenden (DE); Jai-Won Park, Gottingen (DE); Karl Kohler, Diekholzen (DE)

(73) Assignee: Solvay Infra Bad Hoenningen GmbH, Hannover (DE)

( * ) Notice: Subject to any disclaimer, the term of this patent is extended or adjusted under 35 U.S.C. 154(b) by 88 days.

This patent is subject to a terminal disclaimer.

(21) Appl. No.: 11/916,408

(22) PCT Filed: Jun. 2, 2006

(86) PCT No.: PCT/EP2006/062866
§ 371 (c)(1),
(2), (4) Date: Jul. 8, 2008

(87) PCT Pub. No.: WO2006/131500
PCT Pub. Date: Dec. 14, 2006

(65) Prior Publication Data
US 2008/0312362 A1    Dec. 18, 2008

(30) Foreign Application Priority Data
Jun. 4, 2005   (DE) .................. 10 2005 025 719

(51) Int. Cl.
C08K 3/30    (2006.01)
C08K 5/53    (2006.01)
C08K 5/41    (2006.01)

(52) U.S. Cl. ........ 524/423; 524/133; 524/147; 524/167; 524/173

(58) Field of Classification Search .................. 524/423, 524/133, 147, 167, 173
See application file for complete search history.

(56) References Cited

U.S. PATENT DOCUMENTS

| 4,035,213 | A | * | 7/1977 | Thoma et al. .................. 156/231 |
| 5,183,614 | A | * | 2/1993 | Champion .................... 264/184 |
| 5,312,604 | A | | 5/1994 | Jaeger et al. |
| 2003/0124048 | A1 | | 7/2003 | Hardinghaus et al. |
| 2003/0149116 | A1 | * | 8/2003 | Carney et al. .................... 516/34 |
| 2003/0159622 | A1 | | 8/2003 | Amirzadeh-Ash et al. |
| 2004/0167251 | A1 | * | 8/2004 | Amirzadeh-Asl et al. .... 523/200 |
| 2004/0254283 | A1 | * | 12/2004 | Musch et al. .................. 524/430 |
| 2007/0140938 | A1 | | 6/2007 | Hardinghaus et al. |
| 2007/0232725 | A1 | | 10/2007 | Stahl et al. |
| 2007/0254982 | A1 | | 11/2007 | Kohler et al. |
| 2008/0227901 | A1 | | 4/2008 | Lefevre et al. |

FOREIGN PATENT DOCUMENTS

| JP | 57 51119 | 3/1982 |
| WO | 00 14165 | 3/2000 |
| WO | 00 57932 | 10/2000 |
| WO | 01 05883 | 1/2001 |
| WO | 01 92157 | 12/2001 |
| WO | 02 30994 | 4/2002 |
| WO | 2005 054133 | 6/2005 |
| WO | 2005 054357 | 6/2005 |
| WO | 2005 054380 | 6/2005 |

OTHER PUBLICATIONS

U.S. Appl. No. 12/278,453, filed Aug. 6, 2008, Glende, et al.
U.S. Appl. No. 12/282,234, filed Sep. 9, 2008, Glende, et al.
U.S. Appl. No. 11/916,340, filed Dec. 3, 2007, Hardinghaus, et al.
U.S. Appl. No. 11/916,394, filed Dec. 3, 2007, Koehler, et al.
U.S. Appl. No. 11/916,353, filed Dec. 3, 2007, Koehler, et al.

* cited by examiner

*Primary Examiner* — Milton I Cano
*Assistant Examiner* — John Uselding
(74) *Attorney, Agent, or Firm* — Oblon, Spivak, McClelland, Maier & Neustadt, L.L.P.

(57) ABSTRACT

The invention discloses a method of incorporating deagglomerated barium sulphate having an average primary particle size of less than 0.5 μm and coated with a dispersant into plastics or precursors of plastics, for example into polyols. The deagglomerated barium sulphate is dispersed in an organic solvent, the dispersion is incorporated into the plastic or the precursor of the plastic, and the solvent is evaporated off.

25 Claims, No Drawings

METHOD OF GENERATING A DISPERSION OF DEAGGLOMERATED BARIUM SULPHATE IN PLASTICS OR PLASTICS PRECURSORS

This application is a 371 of PCT/EP06/62866 filed Jun. 2, 2006. This application also claims priority to German application 10 2005 025 719.4 filed Jun. 4, 2005.

The present invention relates to a method of generating a dispersion of deagglomerated barium sulphate in plastics or plastics precursors and also to dispersions in polyol preparations or diisocyanate preparations.

The use of barium sulphate as a filler for plastics is already known. International patent application WO 00/14165 discloses the preparation of barium sulphate embedded in finely divided form in a carrier material. The particle size is 0.01 to 10 µm; they have good properties in connection with matting. Production takes place by wet fine milling in the presence of the carrier material.

International patent application WO 02/30994 discloses the addition of an inorganic barium sulphate of this kind to raw materials for polymers, prior to the formation of polymer. The preferred average particle size $D_{50}$ of the inorganic solid embedded into the organic substance is 0.25 to 0.45 µm. The additive compositions are used in polyester and polyamide.

International patent application WO 00/57932 discloses materials for surgical application that contain what is referred to as nanocomposites. The filler particles can be treated with organic compounds in order to enhance their dispersibility, to reduce their propensity to agglomerate or aggregate, and to enhance the uniformity of the dispersion. Examples of compounds employed for this purpose include organic compounds such as the monomer of the surgical material under production, citrates or other compounds. Use may also be made of coupling agents such as organosilanes or of polymeric materials such as surfactants, an example being sodium dodecyl sulphate, but also of amphiphilic molecules, i.e. molecules which have a hydrophilic part and a hydrophobic part. Those specified include nonylphenol ethoxylates, bis(2-ethylhexyl) sulphosuccinate, hexadecyltrimethylammonium bromide, and phospholipids. The examples use either uncoated barium sulphate or particles coated with sodium citrate following precipitation.

International patent application WO 01/05883 describes a method of incorporating fillers into polyols or isocyanates with the objective of preparing polyurethane with filler. There a dispersion of $SiO_2$ is used as nanoscale filler.

The international patent application filed as PCT/EP04/013612, unpublished at the priority date of the present specification, discloses deagglomerated barium sulphate having very good redispersibility, lending itself well to incorporation into polymers, and giving the polymers advantageous properties such as scratch resistance.

It is an object of the present invention to specify an advantageous method of incorporating the barium sulphate described in the aforementioned PCT application PCT/EP04/013612 into plastics or plastics precursors.

The method of the invention for preparing a plastics premix or a plastic which comprises a dispersant and, based on the total weight of the plastics premix or of the plastic, 0.1% to 70% by weight of primary particles comprising deagglomerated barium sulphate, optionally containing a crystallization inhibitor, having an average primary particle size <0.5 µm, preferably <0.1 µm, particularly <80 nm, with particular preference <50 nm, more preferably <20 nm, with very particular preference <10 nm, envisages dispersing and deagglomerating the barium sulphate comprising the crystallization inhibitor, in the presence of a dispersant, in an organic solvent as continuous organic phase, introducing the dispersion into a plastic or the precursor of a plastic, and evaporating off the solvent.

The barium sulphate described in the international patent application PCT/EP04/013612 is elucidated in greater details below.

Preference is given to deagglomerated barium sulphate having an average (primary) particle size of <0.1 µm, particularly <0.08 µm (i.e. 80 nm), with very particular preference <0.05 µm (i.e. 50 nm), more preferably still <0.03 µm (i.e. 30 nm). Outstanding particles are those with sizes <20 nm, especially those with an average primary particle size of <10 nm. The lower limit on the primary particle size is for example 5 nm, but may also be even lower. The particle sizes in question are average particle sizes as determined by XRD or laser diffraction methods. A preferred barium sulphate is obtainable by precipitating barium sulphate in the presence of a crystallization inhibitor, with a dispersant present during the precipitation and/or with the barium sulphate being deagglomerated postprecipitation in the presence of a dispersant.

The amount of crystallization inhibitor and dispersant in the deagglomerated barium sulphate is flexible. Per part by weight of barium sulphate it is possible for there to be up to 2 parts by weight, preferably up to 1 part by weight, each of crystallization inhibitor and dispersant. Crystallization inhibitor and dispersant are present preferably in an amount of 1% to 50% by weight each in the deagglomerated barium sulphate. The amount of the barium sulphate present is preferably from 20% to 80% by weight.

It is known that, in the course of its conventional preparation, barium sulphate forms agglomerates ("secondary particles") made up of primary particles. The term "deagglomerated" in this context does not mean that the secondary particles have been broken down completely into primary particles which exist in isolation. It means that the secondary barium sulphate particles are not in the same agglomerated state in which they are typically produced in precipitations, but instead are in the form of smaller agglomerates. The deagglomerated barium sulphate of the invention preferably contains agglomerates (secondary particles) which have an average particle diameter of less than 2 µm, preferably less than 1 µm. With preference it is smaller than 250 nm, with very particular preference smaller than 200 nm. More preferably still the average particle diameters are smaller than 130 nm, with particular preference smaller than 100 nm, with very particular preference smaller than 80 nm; more preferably still they are less than 50 nm, and even than 30 nm. In part or even in substantial entirety the barium sulphate is in the form of unagglomerated primary particles. The average particle sizes in question are those determined by XRD or laser diffraction methods.

A corresponding barium sulphate having an average primary particle size <50 nm, preferably <30 nm, in particular <20 nm, very particularly <10 nm preferably has a BET surface area of at least 30 $m^2/g$, in particular at least 40 $m^2/g$, with particular preference at least 45 $m^2/g$ and with very particular preference at least 50 $m^2/g$.

Preferred crystallization inhibitors have at least one anionic group. The anionic group of the crystallization inhibitor is preferably at least one sulphate, at least one sulphonate, at least one (preferably at least two) phosphate, at least two phosphonate or at least two carboxylate group(s).

Crystallization inhibitors present may be, for example, substances that are known to be used for this purpose, examples being relatively short-chain or else longer-chain polyacrylates, typically in the form of the sodium salt; polyethers such as polyglycol ethers; ether sulphonates such as lauryl ether sulphonate in the form of the sodium salt; esters of phthalic acid and of its derivatives; esters of polyglycerol; amines such as triethanolamine; and esters of fatty acids, such as stearic esters, as specified in WO 01/92157.

As crystallization inhibitor it is also possible to use a compound of the formula (I) or a salt thereof having a carbon chain R and n substituents [A(O)OH]

in which

R is an organic radical which has hydrophobic and/or hydrophilic moieties, R being a low molecule mass, oligomeric or polymeric, optionally branched and/or cyclic carbon chain which optionally contains oxygen, nitrogen, phosphorus or sulphur heteroatoms, and/or being substituted by radicals which are attached via oxygen, nitrogen, phosphorus or sulphur to the radical R, and A being C, P(OH), OP(OH), S(O) or OS(O), and n being 1 to 10 000.

In the case of monomeric or oligomeric compounds, n is preferably 1 to 5.

Useful crystallization inhibitors of this kind include carboxylic acid compounds, particularly those that are substituted by at least one hydroxyl group. Highly useful examples include hydroxy-substituted monocarboxylic and dicarboxylic acids. Such carboxylic acids preferably have 1 to 20 carbon atoms in the chain (reckoned without the carbon atoms of the COO groups), such as citric acid, malic acid (2-hydroxybutane-1,4-dioic acid), dihydroxysuccinic acid and 2-hydroxyoleic acid, for example. Very particular preference is given to citric acid and polyacrylate as crystallization inhibitor.

Also extremely useful are phosphonic acid compounds having an alkyl (or alkylene) radical with a chain length of 1 to 10 carbon atoms. Useful compounds in this context are those having one, two or more phosphonic acid radicals. They may additionally be substituted by hydroxyl groups. Highly useful examples include 1-hydroxyethylenediphosphonic acid, 1,1-diphosphonopropane-2,3-dicarboxylic acid and 2-phosphonobutane-1,2,4-tricarboxylic acid. These examples show that compounds having not only phosphonic acid radicals but also carboxylic acid radicals are likewise useful.

Also very useful are compounds which contain 1 to 5 or an even greater number of nitrogen atoms and also 1 or more, for example up to 5, carboxylic acid or phosphonic acid radicals and which are optionally substituted additionally by hydroxyl groups. These include, for example, compounds having an ethylenediamine or diethylenetriamine framework and carboxylic acid or phosphonic acid substituents. Examples of highly useful compounds include diethylentriaminepentakis (methanephosphonic acid), iminodisuccinic acid, diethylentriaminepentaacetic acid and N-(2-hydroxyethyl)-ethylenediamine-N,N,N-triacetic acid.

Also very useful are polyamino acids, an example being polyaspartic acid.

Also extremely useful are sulphur-substituted carboxylic acids having 1 to 20 carbon atoms (reckoned without the carbon atoms of the COO group) and 1 or more carboxylic acid radicals, an example being sulphosuccinic acid bis-2-ethylhexyl ester (dioctyl sulphosuccinate).

The crystallization inhibitor is preferably an optionally hydroxy-substituted carboxylic acid having at least two carboxylate groups; an alkyl sulphate; an alkylbenzenesulphonate; a polyacrylic acid; a polyaspartic acid; an optionally hydroxy-substituted diphosphonic acid; ethylenediamine or diethylenetriamine derivatives containing at least one carboxylic acid or phosphonic acid and optionally substituted by hydroxyl groups; or salts thereof.

It is of course also possible to use mixtures of the additives, including mixtures, for example, with further additives such as phosphorous acid.

The preparation of the above-described barium sulphate intermediate with the crystallization inhibitors, particularly those of the formula (I), is advantageously carried out by precipitating the barium sulphate in the presence of the envisaged crystallization inhibitor. It can be advantageous if at least part of the inhibitor is deprotonated; for example, by using the inhibitor at least in part, or entirely, as an alkali metal salt, a sodium salt for example, or as an ammonium salt. Naturally it is also possible to use the acid and to add a corresponding amount of the base, or in the form of an alkali metal hydroxide solution.

The deagglomerated barium sulphate comprises not only the crystallization inhibitor but also an agent which has a dispersing action. This dispersant prevents the formation of undesirably large agglomerates when added during the actual precipitation. As will be described later on below, it can also be added in a subsequent deagglomeration stage; it prevents reagglomeration and ensures that agglomerates are readily redispersed.

The dispersant preferably has one or more anionic groups which are able to interact with the surface of the barium sulphate. Such anionic groups will act as anchor groups for the surface of the barium sulphate particles. Preferred groups are the carboxylate group, the phosphate group, the phosphonate group, the bisphosphonate group, the sulphate group and the sulphonate group.

Dispersants which can be used include some of the above-mentioned agents which as well as a crystallization inhibitor effect also have a dispersing effect. When agents of this kind are used, it is possible for crystallization inhibitor and dispersant to be identical. Suitable agents can be determined by means of routine tests. The consequence of agents of this kind with a crystallization inhibitor and dispersing effect is that the precipitated barium sulphate is obtained as particularly small primary particles and forms readily redispersible agglomerates. Where an agent of this kind having both crystallization inhibitor and dispersing effect is used, it may be added during the precipitation and, if desired, deagglomeration may additionally be carried out in its presence.

It is usual and preferable to use different compounds having crystallization inhibitor action and dispersing action.

Very advantageous deagglomerated barium sulphate is that comprising dispersants of a kind which endow the barium sulphate particles with a surface which prevents reagglomeration and/or inhibits agglomeration electrostatically, sterically, or both electrostatically and sterically. Where such a dispersant is present during the actual precipitation, it inhibits the agglomeration of the precipitated barium sulphate, so that deagglomerated barium sulphate is obtained even at the precipitation stage. Where such a dispersant is incorporated after the precipitation, as part of a wet-grinding operation, for example, it prevents the reagglomeration of the deagglomerated barium sulphate after the deagglomeration. Barium sulphate comprising a dispersant of this kind is especially preferred on account of the fact that it remains in the deagglomerated state.

A particularly advantageous deagglomerated barium sulphate is characterized in that the dispersant has carboxylate, phosphate, phosphonate, bisphosphonate, sulphate or sulphonate groups which are able to interact with the barium sulphate surface (anchor group for the surface of the barium sulphate particles), and in that it has one or more organic radicals $R^1$ which have hydrophobic and/or hydrophilic moieties.

Preferably $R^1$ is a low molecular mass, oligomeric or polymeric, optionally branched and/or cyclic carbon chain which optionally contains oxygen, nitrogen, phosphorus or sulphur heteroatoms and/or is substituted by radicals which are attached via oxygen, nitrogen, phosphorus or sulphur to the radical $R^1$ and the carbon chain is optionally substituted by hydrophilic or hydrophobic radicals. One example of substituent radicals of this kind are polyether or polyester based side chains. Preferred polyether based side chains have 3 to 50, preferably 3 to 40, in particular 3 to 30 alkyleneoxy groups. The alkyleneoxy groups are preferably selected from the group consisting of methyleneoxy, ethyleneoxy, propyleneoxy and butyleneoxy groups. The length of the polyether based side chains is generally from 3 to 100 nm, preferably from 10 to 80 nm.

Preferred barium sulphate comprises a dispersant which has groups for coupling to or into polymers. Such groups will act as anchor groups for the polymer matrix. These may be groups which bring about this coupling chemically, examples being OH, NH, $NH_2$, SH, O—O peroxo, C—C double bond or 4-oxybenzonphenone propylphosphonate groups. The groups in question may also be groups which bring about physical coupling.

An example of a dispersant which renders the surface of the barium sulphate hydrophobic is represented by phosphoric acid derivatives in which one oxygen atom of the P(O) group is substituted by a C3-C10 alkyl or alkenyl radical and a further oxygen atom of the P(O) group is substituted by a polyether side chain. A further acidic oxygen atom of the P(O) group is able to interact with the barium sulphate surface.

The dispersant may be, for example, a phosphoric diester having a polyether or a polyester based side chain and an alkenyl group as moieties. Alkenyl groups with 4 to 12, in particular 4 to 6 carbon atoms are highly suitable. Phosphoric esters with polyether/polyester side chains such as Disperbyk®111, phosphoric ester salts with polyether/alkyl side chains such as Disperbyk®102 and 106, substances having a deflocculating effect, based for example on high molecular mass copolymers with groups possessing pigment affinity, such as Disperbyk® 190, or polar acidic esters of long-chain alcohols, such as Disperplast®1140, are further highly useful types of dispersants.

A barium sulphate having especially good properties comprises as dispersant a polymer which has anionic groups which are able to interact with the surface of the barium sulphate (anchor groups for the surface of the barium sulphate particles), examples being the groups specified above, and contains groups for coupling to or into polymers, such as OH, NH, $NH_2$, SH, O—O peroxo, C—C double bond or 4-oxybenzonphenone propylphosphonate groups (anchor groups for the polymer matrix). Preferably there are polyether or polyester based side chains present which contain OH, NH, $NH_2$, SH, O—O peroxo, C—C double bond or 4-oxybenzonphenone propylphosphonate groups. Barium sulphate of this kind according to the invention exhibits no propensity to reagglomerate. In the course of the application there may even be further deagglomeration.

As a result of the substitution with polar groups, especially hydroxyl groups and amino groups, the barium sulphate particles are externally hydrophilicized.

Preferred dispersants contain at least one anionic group which will act as an anchor group for the surface of the barium sulphate particles, at least one polyether or polyester based side chain that prevents reagglomeration sterically, and at least one group which will act as an anchor group for the polymer matrix.

The groups used for coupling to or into polymers can be preferentially selected with regard to the nature of the polymer matrix. The polar groups, especially hydroxyl groups and amino groups, represent reactive groups which are suitable for coupling to or into epoxy resins in particular. Especially good properties are exhibited by a barium sulphate coated with a dispersant which has a multiplicity of polycarboxylate groups and a multiplicity of hydroxyl groups and also has further substituents which are sterically bulky, examples being polyether or polyester based chains. A very preferred group of dispersants, notably for nanoparticulate barium sulphate used as a filler in epoxy resins, are polyether polycarboxylates substituted terminally on the polyether based chains by hydroxyl groups. Hydroxyl groups are also notably suitable for coupling to or into polyurethanes. Hydroxyl groups and thiol groups can be used for coupling to or into polyvinylchloride (PVC). Another example is 4-oxybenzophenone propylphosphonate which can be used for coupling to or into polyolefines or PVC, O—O peroxo groups are useful anchor groups for unsaturated polyester or polyolefines. After admixture of the barium sulphate containing the dispersant to the resin, the reaction between the peroxo group and the resin is initiated. A further example is the use of C—C double bond for coupling to or into unsaturated polyesters.

Barium sulphate of this kind, having a crystal growth inhibitor and one of the particularly preferred dispersants that prevents reagglomeration sterically, especially a dispersant substituted by anchor groups for the polymer matrix as described above, has the great advantage that it comprises very fine primary particles and comprises secondary particles whose degree of agglomeration is low at most, these particles, since they are readily redispersible, having very good application properties—for example, they can be incorporated readily into polymers and do not tend towards reagglomeration, and indeed even undergo further deagglomeration in the course of the application.

International patent application PCT/EP04/013612 describes a number of methods for preparing the barium sulphate.

The first method envisages precipitating barium sulphate optionally in the presence of a crystallization inhibitor and then carrying out a deagglomeration in the solvent provided. This deagglomeration is carried out in the presence of a dispersant.

The second method envisages precipitating barium sulphate in the presence of an optional crystallization inhibitor and a dispersant. In the course of the subsequent deagglomeration in the solvent envisaged it is likewise possible for a dispersant to be present.

The first method is now elucidated in more detail.

Barium sulphate is precipitated by typical methods, such as by reacting barium chloride or barium hydroxide with alkali metal sulphate or sulphuric acid. In the course of this precipitation, methods are employed in which primary particles are formed with the fineness indicated above. In the course of the precipitation, additives may be employed which inhibit crystallization, examples being those as specified in WO 01/92157, or the aforementioned compounds of the formula (I) which have a crystallization inhibitor effect. The precipitated barium sulphate is then dried, for example spray-dried.

The second method of preparing the redispersible barium sulphate envisages carrying out the precipitation, for example by reacting barium chloride or barium hydroxide with alkali metal sulphate or sulphuric acid, in the presence of an optional crystallization inhibitor and in the presence of a dispersant; this procedure leads to the formation of readily redispersible deagglomerated barium sulphate during the actual precipitation. Dispersants of this kind, which endow the barium sulphate particles with a surface which prevents reagglomeration and inhibits agglomeration during the precipitation electrostatically, sterically, or both electrostatically and sterically, have been elucidated earlier on above. This embodiment produces deagglomerated barium sulphate as early as during the precipitation stage. The thus-precipitated barium sulphate, comprising an optional crystallization inhibitor and a dispersant, is dried, by means of spray drying, for example.

There now follows a wet deagglomeration in the desired organic solvent, in a stirring or mixing apparatus or a mill, such as in a bead mill, a vibratory mill, an agitator-mechanism mill, a planetary ball mill or a dissolver with glass spheres for example, in order to generate the dispersion. Where barium sulphate produced in accordance with the first method is dispersed, a dispersant is added in every case. Where barium sulphate produced in accordance with the second method is dispersed, the addition of dispersant is a possibility. The dispersants have been specified above; by way of example it is possible to use an agent of the formula (I) that has dispersing properties. In this case the crystallization inhibitor and the dispersant may be the same. The crystallization inhibitor effect is used in the course of the precipitation, the dispersing effect in the course of the deagglomeration. For the preparation of the dispersion it is preferred to use those dispersants which contain at least one polyether or polyester based side chain and which therefore prevent reagglomeration sterically. Especially suitable dispersants contain OH, NH, $NH_2$, SH, O—O peroxo, C—C double bond or 4-oxybenzonphenone propylphosphonate groups which will act as anchors for the polymer matrix. The groups used for coupling to or into polymers can be preferentially selected with regard to the nature of the polymer matrix.

The grinding in the organic solvent and hence the deagglomeration are carried out until the desired degree of deagglomeration has been reached. The deagglomeration is preferably carried out until the deagglomerated barium sulphate of the invention comprises secondary particles having an average diameter of smaller than 2 μm, preferably smaller than 1 μm, with particular preference smaller than 250 nm, with very particular preference smaller than 200 nm. With even greater preference deagglomeration is carried out until the average particle diameter is less than 130 nm, with particular preference less than 100 nm, with very particular preference less than 80 nm, more preferably still <50 nm. The barium sulphate in this case may in part or even in substantial entirety be present in the form of unagglomerated primary particles (average particle sizes, determined by XRD or laser diffraction methods). In the method of the invention it is preferred to use a dispersion which comprises barium sulphate with an average primary particle size <50 nm, preferably <20 nm, which is substantially agglomerate-free, and in which, therefore, the average secondary particle size is not more than 30% greater than the average primary particle size.

Within the dispersion, the deagglomerated barium sulphate is present preferably in an amount of 0.1% to 70%, preferably 1% to 60%, in particular 10% to 60%, for example 10% to 25% or 10% to 20% by weight.

The organic solvent is selected with regard to the intended application. It must be compatible with the plastic or with the plastics precursor: for example, it must not exhibit unwanted reaction, and it must be sufficiently soluble therein. Suitable solvents are also preferably chosen in view of the polymer polarity. Examples of suitable solvents notably include alkanols or diols, such as methanol, propanol, isopropanol or n-butanol; ethers, such as diethylether, tetrahydrofuran or ethers of glycol; carboxylic esters, such as ethyl acetate; ketones such as acetone, methyl ethyl ketone or cyclopentanone; hydrocarbons, such as solvent naphta; halogenated organic solvents, such as dichloromethane; or mixture thereof.

In order to generate a dispersion of the deagglomerated barium sulphate into a plastic composition, a dispersion of the deagglomerated barium sulphate in a suitable solvent is first mixed with the plastic or a precursor of the plastic. The mixing can take place, for example in a mixing apparatus or vessel equipped with a stirrer mechanism. It is possible to raise the temperature in order to lower the viscosity. After mixing has taken place, the solvent is evaporated off, usually by increase of the temperature and/or by application of a vacuum. Hence the barium sulphate is in dispersion in the plastic or the precursor of the plastic.

The deagglomerated barium sulphate is suitable as an additive, notably for plastics, examples being saturated and unsaturated polyolefines, PVC, phenolic resins, acrylic resins, alkyd resins, epoxy resins, saturated and unsaturated polyesters, polyurethanes, silicone resins, urea resin and melamine resin, polycarbonate and polyamide resin. Plastics with added barium sulphate particles of the invention are likewise provided by the invention. The amount of barium sulphate particles in the plastic is advantageously 1% to 50% by weight, preferably 1% to 25% by weight.

The method described above is notably very suitable for incorporating barium sulphate into hydrophobic plastics, such as polycarbonate or PVC, by mixing a dispersion of the barium sulphate particles in a low polarity solvent, such as halogenated organic solvent, ether or ester, with the plastic or precursors thereof, then evaporating off the solvent. Another example is the use of a dispersion of barium sulphate in acetone for incorporation into unsaturated polyester resin. This method is also very suitable for incorporating barium sulphate into epoxy resins, using a dispersion of the barium sulphate in a polar solvent. The dispersion of the barium sulphate can also be added to the epoxy resin precursors. The method of the invention is also especially suitable for incorporating the barium sulphate described into the polyol precursor and/or the diisocyanate and/or polyisocyanate precursor of polyurethane, as described for $SiO_2$ in WO 01/05883. In this case, preferred dispersants are dispersants comprising hydroxyl groups as anchor groups for the polymer matrix. This method is elucidated further with reference to this preferred embodiment.

Aliphatic, cycloaliphatic, aromatic and heterocyclic di-, tri- and tetraisocyanate compounds that can be used are disclosed in WO 01/05883, examples being those of the formula $Q(NCO)_n$, where n is 2 to 4 and Q is an aliphatic hydrocarbon radical having 2 to 18 carbon atoms, a cycloaliphatic hydrocarbon radical having 4 to 15 carbon atoms, an aromatic hydrocarbon radical having 6 to 15 carbon atoms or an araliphatic hydrocarbon radical having 8 to 15 carbon atoms.

WO 01/05883 also describes the higher molecular mass polyhydroxyl compounds which can be used, and which react with the isocyanate groups to form polyurethane. Suitable higher molecular mass polyhydroxyl compounds include those having at least two hydrogen atoms that are reactive with respect to NCO groups, preferably polyester polyols and polyether polyols. These compounds can be prepared by known processes. Polyether polyols can be prepared, for example, by anionic polymerization of alkylene oxides in the presence of alkali metal hydroxides or alkali metal alkoxides as catalysts, with the addition of at least one starter molecule containing 2 to 3 reactive hydrogen atoms in bonded form, or by cationic polymerization of alkylene oxides in the presence of Lewis acids such as boron fluoride etherate. Polyester polyols can be prepared for example from organic dicarboxylic acids having 2 to 12 carbon atoms and diols having 2 to 12 carbon atoms.

The polyurethanes can be prepared by mixing higher molecular mass polyhydroxyl compounds, optionally lower molecular mass chain extender or crosslinker, with the isocyanate compounds in one step. If desired it is possible first to form a prepolymer with higher molecular mass polyhydroxyl compounds, polyester polyols and polyether polyols for example, and with isocyanates, and then to react this prepolymer further with chain extenders or crosslinker compounds.

The barium sulphate can be incorporated in dispersion form into the polyol component or into the isocyanate component or the prepolymer, and also, if desired, into a crosslinker, which may be an alkanediol, dialkylene or polyalkylene glycol, or a chain extender, which may be an alkanediol, alkylene glycol or polyoxyalkylene glycol. This may take place in a mixing apparatus. Depending on the viscosity it is possible to raise the temperature above room temperature when mixing, to 25 to 50° C. for example.

If it is intended to incorporate the barium sulphate into the polyol, the crosslinker or chain extender, the range of solvents which can be used is very broad. Suitable solvents include alcohols, especially those having 1 to 6 carbon atoms such as methanol, ethanol or isopropanol, ethanediol, 1,4-butanediol, 1,6-hexanediol; cyclic ethers such as tetrahydrofuran or dioxane; ethers, particularly those having 2 to 6 carbon atoms such as dimethyl ether or diethyl ether; alkanes, particularly those having 4 to 8 carbon atoms such as pentane, cyclopentane or hexane, heptane; aromatic compounds such as toluene; and ketones, particularly those having 2 to 6 carbon atoms such as acetone or 2-butanone. Preferably, if the precursor of the plastic is a polyol for the preparation of polyurethane, the organic solvent is an alcohol.

If the precursor of the plastic is an NCO-containing polyurethane precursor, the organic solvent chosen usually comprises an organic solvent which is inert towards NCO groups. If it is intended to incorporate the barium sulphate into the cyanate component or into the prepolymer still containing isocyanate groups, then aprotic solvents are selected which do not exhibit unwanted reaction with the NCO groups, examples being cyclic ethers such as tetrahydrofuran or dioxane; ethers, particularly those having 2 to 6 carbon atoms such as dimethyl ether or diethyl ether; alkanes, particularly those having 4 to 8 carbon atoms such as pentane, cyclopentane or hexane, heptane; and aromatic compounds such as toluene.

If desired it is also possible to admix relatively small fractions of other solvents. The admixed other solvent in that case is present preferably in an amount of not more than 5% by weight relative to the dispersion as a whole.

After the dispersion has been incorporated into one (or else, if desired, into both) starting component(s) of the polyurethane, the solvent is evaporated off, by an increase in the temperature, of up to 80° C., for example, for up to 4 hours, and/or by a reduction in the pressure.

Additives such as catalysts or blowing agents can be admixed before or after the dispersion has been added.

The invention further provides plastics premix and plastics comprising, dispersed therein, deagglomerated barium sulphate, obtainable by the method described here-above.

The invention further provides a polyol preparation suitable for polyurethane preparation that comprises dispersed deagglomerated barium sulphate, this polyol preparation being obtainable by the method of the invention.

The invention further provides an isocyanate preparation suitable for polyurethane preparation and comprising dispersed deagglomerated barium sulphate, this isocyanate preparation, which may also be a prepolymer, being obtainable by the method of the invention.

By means of the method of the invention it is possible to disperse barium sulphate filler uniformly into polyols.

The present invention further relates to polycarbonate, polyvinylchloride, polyester resin, epoxy resin or epoxy resin precursor comprising, dispersed therein, deagglomerated barium sulphate obtainable by the methods described above.

The examples which follow are intended to illustrate the invention without restricting it in its scope.

EXAMPLES

Preparation takes place as described in PCT/EP04/013612.

Example 1

Preparation of Finely Divided Barium Sulphate as an Intermediate by Precipitation in the Presence of Crystallization Inhibitors General Experimental Instructions:
a) Routine experiment:

A high 600 ml glass beaker is charged with 200 ml of additive solution (containing 2.3 g of citric acid and 7.5 g of Melpers®0030) and 50 ml of sodium sulphate solution with a concentration of 0.4 mol/l. Stirring is carried out centrally in the solution by means of an Ultraturrax stirrer as dispersing aid at 5000 rpm. In the vortex region of the Ultraturrax the barium chloride solution (concentration: 0.4 mol/l) is supplied by means of a Dosimat automatic metering device.
b) The example described as 1a) is repeated but using 200 ml of additive solution containing 2.3 g of citric acid and 50 ml of sodium sulphate solution, but no Melpers®0030.

Unit (V):

An apparatus is used as described in WO 01/92157, in which forces of thrust, shear and friction act on the reaction mixture. The crystallization inhibitor (see Table below) is added to the initial charge of the sulphate solution.

| trade name of the crystallization inhibitor | chemical identity according to manufacturer | Amount of additive [%] | pH of suspension | BET value [m$^2$/g] | XRD value d [nm]* | d 50 without pretreatment of suspension [μm]** |
|---|---|---|---|---|---|---|
| Citronensäure, Merck | citric acid | 7.5 | 12.43 | 75.2 | 22 | 0.287 |
| Citronensäure, Merck | citric acid | 15 | 7.13 | 73 | 18 | 0.142 |

-continued

| trade name of the crystallization inhibitor | chemical identity according to manufacturer | Amount of additive [%] | pH of suspension | BET value [m²/g] | XRD value d [nm]* | d 50 without pretreatment of suspension [μm]** |
|---|---|---|---|---|---|---|
| HEDP, Fluka | 1-hydroxy-ethylenediphosphonic acid tetrasodium salt | 21.6 | 5.9 | 63.4 | 16 | 0.228 |
| Baypur CX 100/34% | iminodisuccinic acid sodium salt in aqueous solution | 15 | 9.6 | 55.9 | 22 | 1.281 |
| Dispex N40, Ciba | neutral sodium salt of a polycarboxylic acid (polyacrylate), molar weight approx. 3500 Da, lowest molar weight of the Dispex series | 3 | 12.85 | 53.9 | 28 | 0.167 |
| Citritex 85, Jungbunzlauer Ladenburg GmbH | Na salt of hydroxy-carboxylic acids | 15 | 6.6 | 53.6 | 31 | 0.273 |
| HEDP | 1-hydroxy-ethylenediphosphonic acid tetrasodium salt | 10.8 | 5.6 | 53.4 | 23 | 0.243 |
| DTPA-P, Fluka | diethylenetriamine pentakis (methane-phosphonic acid) solution | 15 | 6.97 | 52.6 | 17 | 0.169 |
| DTPA | diethylenetriamine pentaacetic acid | 15 | 11.3 | 47.8 | 29 | 0.23 |
| DEVItec PAA | polyaspartic acid, Na salt, in aqueous solution | 15 | 5.73 | 47.7 | 18 | 0.296 |
| Dispex N40 | neutral sodium salt of a polycarboxylic acid (polyacrylate), molar weight approx. 3500 Da, lowest molar weight of the Dispex series | 15 | 10.67 | 46.6 | 19 | 0.167 |
| HEDTA | N-(2-hydroxy-ethyl)ethylene-diamine-N,N,N,-triacetic acid | 3.75 | 8.3 | 46.5 | 38 | 0.317 |
| 4334/HV, SKW | polycarboxylate, aqueous | 15 | 9.9 | 33 | 21 | 0.147 |
| Citronensäure | citric acid | 1.5 | 6.1 | 32.1 | 33 | 1.588 |
| Dispex N40 | neutral sodium salt of a polycarboxylic acid (polyacrylate), molar weight approx. 3500 Da, lowest molar weight of the Dispex series | 15 | 10.08 | 32 | 21 | 0.2 |
| DTPA-P, Fluka | diethylenetriamine pentakis (methane-phosphonic acid) solution | 5 | 11.38 | 31.5 | 29 | 0.197 |
| HEDP | 1-hydroxyethylenedi-phosphonic acid tetrasodium salt | 15 | 2.99 | 30.3 | 34 | 0.364 |
| 4334/HV | polycarboxylate, aqueous | 15 | 6.84 | 30.2 | 23 | 0.152 |
| DTPA-P | diethylenetriamine pentakis (methane-phosphonic acid) solution | 15 | 10.47 | 25.5 | 17 | 0.157 |
| Äpfelsäure, Merck | 2-hydroxybutane-1,4-dioic acid | 15 | 10.47 | 24.2 | 28 | 1.031 |
| Polymethacrylsäure 91 | polymethacrylic acid | 5 | 10.69 | 18.9 | 40 | 0.268 |
| Sokalan PA20 | polyacrylate | 15 | 6.31 | 15.7 | 22 | 0.251 |
| Dispers 715W | Na polyacrylate, aqueous | 15 | 5.99 | 15.1 | 19 | 0.18 |
| Hydropalat N | Na polyacrylate | 15 | 6.03 | 12.5 | 23 | 0.168 |
| VP 4334/8L | polycarboxylate, aqueous | 15 | 6.38 | 12.5 | 24 | 0.148 |

-continued

| trade name of the crystallization inhibitor | chemical identity according to manufacturer | Amount of additive [%] | pH of suspension | BET value [m²/g] | XRD value d [nm]* | d 50 without pretreatment of suspension [μm]** |
|---|---|---|---|---|---|---|
| Dispers 715W | Na polyacrylate, aqueous | 15 | 10.82 | 12.4 | 19 | 0.161 |

*The XRD value corresponds to the average primary particle size diameter measured by XRD
**d 50 without pretreatment of suspension corresponds to the average particle size diameter of barium sulphate particles, including both primary and secondary particles.

The above table shows further suitable crystallization inhibitors which in some cases can also be used as dispersants.

Example 2

Preparation of Barium Sulphate by Precipitation in the Presence of Crystallization Inhibitors and Polymeric Dispersants During Precipitation Starting materials used were barium chloride and sodium sulphate.

2.1. Beaker Experiments:

A 200 ml graduated flask is charged with 7.77 g of the Melpers-type, terminally hydroxy-substituted polyether polycarboxylate (Melpers®0030) from SKW and made up to 200 ml with water. This quantity corresponds to 50% of Melpers (w=30% aqueous solution) based on the maximum amount of $BaSO_4$ formed (=4.67 g).

A 600 ml high glass beaker is charged with 50 ml of a 0.4 M $BaCl_2$ solution, to which the 200 ml of the Melpers solution are added. To aid dispersion an Ultraturrax is immersed centrally into the glass beaker and operated at 5000 rpm. Within the vortex region created by the Ultraturrax 50 ml of a 0.4 M $Na_2SO_4$ solution to which citric acid has been added (50% of citric acid, based on the maximum amount of $BaSO_4$ formed: 2.33 g per 50 ml/$Na_2SO_4$) are added via a flexible tube, using a Dosimat. Both the $BaCl_2$/Melpers solution and the $Na_2SO_4$/citric acid solution are rendered alkaline using NaOH prior to precipitation; the pH is approximately 11-12.

The barium sulphate obtained in deagglomerated form possesses a primary particle size of approximately 10 to 20 nm; the secondary particle size is in the same range, and so the barium sulphate is regarded as largely free of agglomerate.

2.2. Preparation of Deagglomerated Barium Sulphate on the Pilot Plant Scale

A 30 l vessel is charged with 5 l of a 0.4 M $BaCl_2$ solution. 780 g of the Melpers product are added with stirring (50%, based on maximum amount of $BaSO_4$ formed: 467 g). To this solution there are added 20 l of demineralized water. Operated within the vessel is an Ultraturrax, in whose vortex region 5 l of a 0.4 M $Na_2SO_4$ solution are added via a stainless steel pipe, using a peristaltic pump. The $Na_2SO_4$ solution has been admixed with citric acid beforehand (233 g/5 l $Na_2SO_4$=50% citric acid, based on maximum amount of $BaSO_4$ formed). As in the case of the beaker experiments, both solutions have been rendered alkaline by means of NaOH prior to precipitation in these experiments as well. The properties in respect of primary particle size correspond to those of the barium sulphate from Example 2.1. The sulphate is likewise largely free from agglomerates.

2.3. Preparation of Deagglomerated Barium Sulphate with Higher Reactant Concentrations Example 2.2 is repeated. On this occasion 1-molar solutions are used. The barium sulphate obtained corresponds to that of Example 2.2.

Example 3

Preparation of a Dispersion with Deagglomerated Barium Sulphate 3.1. Preparation of a Dispersion Using Melpers®0030

The barium sulphate prepared in accordance with Example 1 and Examples 2.1, 2.2 and 2.3 is dried and subjected to wet grinding in isopropanol in a bead mill with addition of a dispersant. The dispersant used is a polyether polycarboxylate substituted terminally on the polyether side chains by hydroxyl groups (Melpers type from SKW, molar weight approximately 20 000, side chain 5800).

3.2. Preparation of a Dispersion Using Disperbyk®102

The example 3.1 is repeated but the dispersant that is used is a phosphoric ester having one free hydroxyl group, namely Disperbyk®102.

Example 4

Preparation of Barium Sulphate with Grinding 4.1. Preparation of Chemically Dispersed Barium Sulphate by Precipitation in the Presence of Crystallization Inhibitors and Subsequent Grinding in the Presence of Polymeric Dispersants Starting materials used are barium chloride and sodium sulphate. Barium chloride solution (0.35 mol/l) and sodium sulphate solution (0.35 mol/l) are reacted in the presence of citric acid as crystallization inhibitor, with precipitation of barium sulphate. The precipitated barium sulphate is dried and suspended in isopropanol. A polyether polycarboxylate substituted terminally on the polyether side chains by hydroxyl groups (Melpers®0030) is added as dispersant and the precipitated barium sulphate is further deagglomerated in a bead mill. The barium sulphate contains about 7.5% by weight of citric acid and about 15% by weight of the polyether polycarboxylate.

4.2. Preparation Using Other Starting Compounds and a Different Crystallization Inhibitor Example 4.1. is repeated. Barium chloride is replaced by barium hydroxide solution (0.35 mol/l) and sodium sulphate by sulphuric acid (0.35 mol/l). Instead of citric acid 3% by weight of Dispex® N40 are used (a sodium polyacrylate). Melpers®0030 was used in an amount of 8.5% by weight.

Example 5

Incorporation of the Barium Sulphate Dispersion in a Polyol

A dispersion prepared as described above and containing approximately 50% by weight of barium sulphate, agglomerate size <100 nm, in isopropanol is mixed in a polyol (Lupraphen 8100, a difunctional aliphatic polyester polyol available from Elastogran GmbH, Lemförde (DE)), this mixing being brought about by stirring the components together in a bead mill. Subsequently the solvent is removed by distillation.

In the case of exacting requirements imposed on the absence of solvent, distillative removal is carried out lastly at approximately 80° C. for 2 hours.

The amounts of dispersion and polyol are selected such that in the final polyol there is about 30% by weight of dispersed barium sulphate.

A further example is done in the same conditions, except that the amounts of dispersion and plastic are selected such that the finished plastic contains approximately 45% by weight of barium sulphate in dispersed form. This shows that ranges of 30 to 45% of barium sulphate in plastics is easily obtainable by this process.

The final dispersion of barium sulphate in the polyol can then be processed further with diisocyanate or polyisocyanate components in a known way to give a polyurethane.

The invention claimed is:

1. A method for preparing a plastics premix or a plastic which comprises, based on the total weight of the plastics premix or of the plastic, 0.1% to 70% by weight of primary particles comprising deagglomerated barium sulphate comprising a crystallization inhibitor and having an average primary particle size <500 nm, which comprises dispersing and deagglomerating the barium sulphate in the presence of a dispersant which is different from the crystallization inhibitor, in an organic solvent as continuous organic phase to produce a dispersion, introducing the dispersion into a plastic or a precursor of the plastic, and evaporating off the solvent,
wherein the dispersant has at least one anionic group which is able to interact with the surface of the barium sulphate, and at least one polyether or polyester based side chain which prevents reagglomeration sterically and which further comprises at least one group for coupling to or into polymers selected from OH, NH, and $NH_2$ groups.

2. The method according to claim 1, wherein the barium sulphate contains primary and secondary barium sulphate particles, the secondary barium sulphate particles having an average particle diameter of smaller than 2000 nm.

3. The method according to claim 1, wherein the crystallization inhibitor is selected from compounds having at least one anionic group, the anionic group being selected from sulphate, sulphonate, phosphate, phosphonate, carboxylate group(s), and mixtures thereof.

4. The method according to claim 1, wherein the crystallization inhibitor is a compound of the formula (I) or salt thereof having a carbon chain R and n substituents [A(O)OH],

$$R[-A(O)OH]_n \qquad (I)$$

in which R is an organic radical which has hydrophobic and/or hydrophilic moieties, R being a low molecular mass, oligomeric or polymeric, optionally branched and/or cyclic carbon chain which optionally contains oxygen, nitrogen, phosphorus or sulphur heteroatoms, and/or being substituted by radicals which are attached via oxygen, nitrogen, phosphorus or sulphur to the radical R, A being C, P(OH), OP(OH), S(O) or OS(O), and n being 1 to 10 000.

5. The method according to claim 1, wherein the crystallization inhibitor is an optionally hydroxy-substituted carboxylic acid having at least two carboxylate groups; an alkyl sulphate; an alkylbenzenesulphonate; a polyacrylic acid; a polyaspartic acid; an optionally hydroxy-substituted diphosphonic acid; ethylenediamine or diethylenetriamine derivatives containing at least one carboxylic acid or phosphonic acid and optionally substituted by hydroxyl groups; or salts thereof.

6. The method according to claim 1, wherein the dispersant anionic groups are selected from carboxylate, phosphate, phosphonate, bisphosphonate, sulphate and sulfonate groups.

7. The method according to claim 6, wherein the dispersant contains one or more organic radicals $R^1$ which have hydrophobic and/or hydrophilic moieties.

8. The method according to claim 7, wherein $R^1$ is a low molecular mass, oligomeric or polymeric, optionally branched and/or cyclic carbon chain which optionally contains oxygen, nitrogen, phosphorus or sulphur heteroatoms and/or is substituted by radicals which are attached via oxygen, nitrogen, phosphorus or sulphur to the radical $R^1$ and the carbon chain is optionally substituted by hydrophilic or hydrophobic radicals.

9. The method according to claim 7, wherein the dispersant is a phosphoric diester having a polyether side chain and an alkenyl group, with 6 to 10 carbon atoms, as moieties.

10. The method according to claim 7, wherein the dispersant has OH groups for coupling to or into polymers.

11. The method according to claim 10, wherein the dispersant has polyether based side chains.

12. The method according to claim 1, wherein the dispersant is a polyether polycarboxylate which is substituted terminally on the polyether based side chains by hydroxyl groups.

13. The method according to claim 1, wherein the crystallization inhibitor and the dispersant are each present in the dispersion in an amount of up to 2 parts by weight per part by weight of barium sulphate.

14. The method according to claim 1, wherein barium sulphate is used which has been precipitated in the presence not only of the crystallization inhibitor but also of a dispersant, the same dispersant or a different dispersant being added additionally if desired during the generation of the dispersion, or in that barium sulphate is used which has been precipitated in the presence only of the crystallization inhibitor, with the dispersant being added during the generation of the dispersion.

15. The method according to claim 1, wherein the method is a method for preparing a plastics premix comprising a polyol useful for preparing a polyurethane and the organic solvent is an alcohol.

16. The method according to claim 1, wherein the method is a method for preparing a plastics premix, wherein the premix comprises an NCO-containing polyurethane precursor of the plastic and wherein the organic solvent comprises an organic solvent which is inert towards NCO groups.

17. The method according to claim 1, wherein the method is a method for preparing a plastic, wherein the plastic is polycarbonate or polyvinylchloride and the organic solvent is an halogenated organic solvent, an ether or an ester.

18. The method according to claim 1, wherein the method is a method for preparing a plastic, wherein the plastic is a polyester resin and the organic solvent is acetone.

19. The method according to claim 1, wherein the method is a method for preparing a plastic, wherein the plastic is an epoxy resin and the organic solvent is an alkanol or a diol.

20. The method according to claim 1, wherein the method is a method for preparing a plastics premix, wherein the premix comprises an epoxy resin precursor, and wherein the organic solvent is an alkanol or a diol.

21. The method according to claim 1, wherein said method is a method for preparing a plastics premix which comprises, based on the total weight of the plastics premix, 0.1% to 70% by weight of primary particles comprising deagglomerated barium sulphate comprising a crystallization inhibitor and having an average primary particle size <500 nm, which comprises dispersing and deagglomerating the barium sulphate in the presence of said dispersant in an organic solvent as continuous organic phase to produce a dispersion, introducing the dispersion into a plastic precursor, and evaporating off the solvent.

22. The method according to claim 1, wherein said method is a method for preparing a plastic which comprises, based on the total weight of the plastic, 0.1% to 70% by weight of primary particles comprising deagglomerated barium sulphate comprising a crystallization inhibitor and having an average primary particle size <500 nm, which comprises dispersing and deagglomerating the barium sulphate in the presence of said dispersant in an organic solvent as continuous organic phase to produce a dispersion, introducing the dispersion into a plastic, and evaporating off the solvent.

23. The method according to claim 1, wherein the dispersant has OH groups for coupling to or into polymers.

24. The method according to claim 1, wherein the dispersant has NH groups for coupling to or into polymers.

25. The method according to claim 1, wherein the dispersant has $NH_2$ groups for coupling to or into polymers.

* * * * *